United States Patent [19]

Harry

[11] Patent Number: 4,678,139

[45] Date of Patent: Jul. 7, 1987

[54] RIBBON CASSETTES AND APPARATUS FOR RECEIVING SAME

[75] Inventor: Alan Harry, Royston, England

[73] Assignee: PA Consulting Services Limited, London, England

[21] Appl. No.: 818,667

[22] Filed: Jan. 14, 1986

[30] Foreign Application Priority Data

Jan. 19, 1985 [GB] United Kingdom ................ 8501406

[51] Int. Cl.[4] ...................... G11B 23/087; B41J 35/28

[52] U.S. Cl. .................................... 242/199; 400/208; 360/96.5

[58] Field of Search ................................ 242/197-200, 242/55.19 A; 400/198, 207, 208, 208.1; 226/118; 352/72, 78 R; 360/96.5

[56] References Cited

U.S. PATENT DOCUMENTS 3,971,071 7/1976 Urayana ............................ 242/199
3,997,918 12/1976 Cicatelli ....................... 242/55.19 A
4,145,727 3/1979 Tuninetti ........................ 360/96.5 X
4,257,075 3/1981 Wysocki et al. ........ 242/55.19 A X
4,359,288 11/1982 Bullock et al. ................ 242/197 X
4,591,934 5/1986 Sims ............................. 360/96.5 X

*Primary Examiner*—John M. Jillions
*Attorney, Agent, or Firm*—Oblon, Fisher, Spivak, McClelland & Maier

[57] ABSTRACT

In a machine which uses cassettes, a compartment is provided for receiving the cassette. Examples of such machines are printing machines using an inked ribbon cassette. In the compartment there is a V-shaped toggle spring which is pivotally mounted at its vertex with two arms and extending forward so that when a cassette is inserted and pushed in against both arms, the latter are splayed apart and the spring pivots and snaps the cassette into a "home" position in which it is retained by a cooperating means on the cassette and the compartment.

6 Claims, 14 Drawing Figures

RIBBON CASSETTES AND APPARATUS FOR RECEIVING SAME

FIELD OF INVENTION

This invention relates to ribbon cassettes of the type containing a spool of ribbon or tape which in use is transferred to a second spool within the cassette and to apparatus using such cassettes.

A cassette incorporating the invention is particularly suited for housing a ribbon which is coated with a thermally activated ink or dye and which is transferred in a printing process by local heating of the ribbon, although it is to be understood that the invention is in no way limited to such applications and may be applied to cassettes such as for example are used in typewriters, printers as used with computers and telex machines and the like, and audio and video apparatus.

BACKGROUND TO THE INVENTION

Cassettes containing a spool of ribbon in which during use, the ribbon is transferred to another spool, are known. They are employed in tape recoders, typewriters, printers and so on to carry items such as magnetic tape or inked ribbon.

The mechanisms used in such arrangements are complex since a motor or other prime mover is usually required to power the drive mechanism, and the cassette must be designed so that the drive mechanism will readily engage the cassette. This is often simplified by allowing the spools to 'float' within the cassette. The spools can then align themselves with the drive mechanism as the cassette is inserted.

A still more complex arrangement is necessary if the cassette is to be inserted into the apparatus in a direction other than parallel to the axes of rotation of the spools. It may then be necessary to use an arrangement in which the drive mechanism is moved into engagement with the cassette spools after the cassette has been fully inserted.

THE INVENTION

According to the present invention there is provided a cassette and compartment for receiving same with retaining means for securing the cassette therein: wherein, spring means is located at the rear of the compartment having two mutually diverging resiliently displacable arms one of which is engagable by the rearwardly advancing face of the cassette and the other of which simultaneously engages a side wall of the cassette as the latter is inserted into the compartment, and whereby, a force is applied by the said other arm of the spring means in a direction generally perpendicular to the direction in which the cassete is introduced into the compartment, so as to move the cassette in the said perpendicular direction into engagement with the said retaining means, for securing the cassette therein.

The retaining means may comprise cooperating grooves and protrusions formed in end walls of the cassette and adjacent walls of the compartment.

Thus for example the retaining means may comprise grooves in opposite ends of the cassette and inwardly directed protrusions within the compartment for engaging same.

Alternatively for example the retaining means may comprise grooves in opposed end walls of the compartment and cooperating protrusions extending from the ends of the cassette.

An aperture may be provided in a side wall of the cassette through which a roller can at least in part protrude to engage a ribbon (or tape) within the cassette to transmit drive thereto or receive drive therefrom, and the engagement of the roller and ribbon (or tape) is effected automatically as the cassette moves in the said perpendicular direction for engagement with the said retaining means.

The cassette may include a supply spool containing a length of ribbon (or tape) and a take-up spool for receiving ribbon (or tape) from the supply spool.

A particular advantage of the invention is that it allows lateral movement of a cassette during insertion. In a particular embodiment of the invention, such a feature is used to advantage in two areas:

(a) to reduce the chances of a tape or ribbon wound by the cassette from snagging on the print head and (b) to allow the ribbon inside the cassette to engage with a drive to a sensor for detecting the motion of the ribbon.

The invention may also for example be applied to a cassette containing an inked ribbon or the like for use in typewriting or printing apparatus or by way of a further example, to a cassette containing an inked ribbon for use in a franking machine.

The invention may also be applied to a cassette containing a magnetic recording tape.

DESCRIPTION OF THE DRAWINGS

A cassette and cassette receiving compartment embodying the invention will be described with reference to a postal franking apparatus illustrated in the accompanying drawings, in which.

The improved cassette of the present invention (shown in FIGS. 6, 7 and 8) will be described in relation to its use in a postal franking machine (shown in the remaining views of the drawings) although it is to be understood that this application is merely one example of the many applications for the invention.

Figure 1:
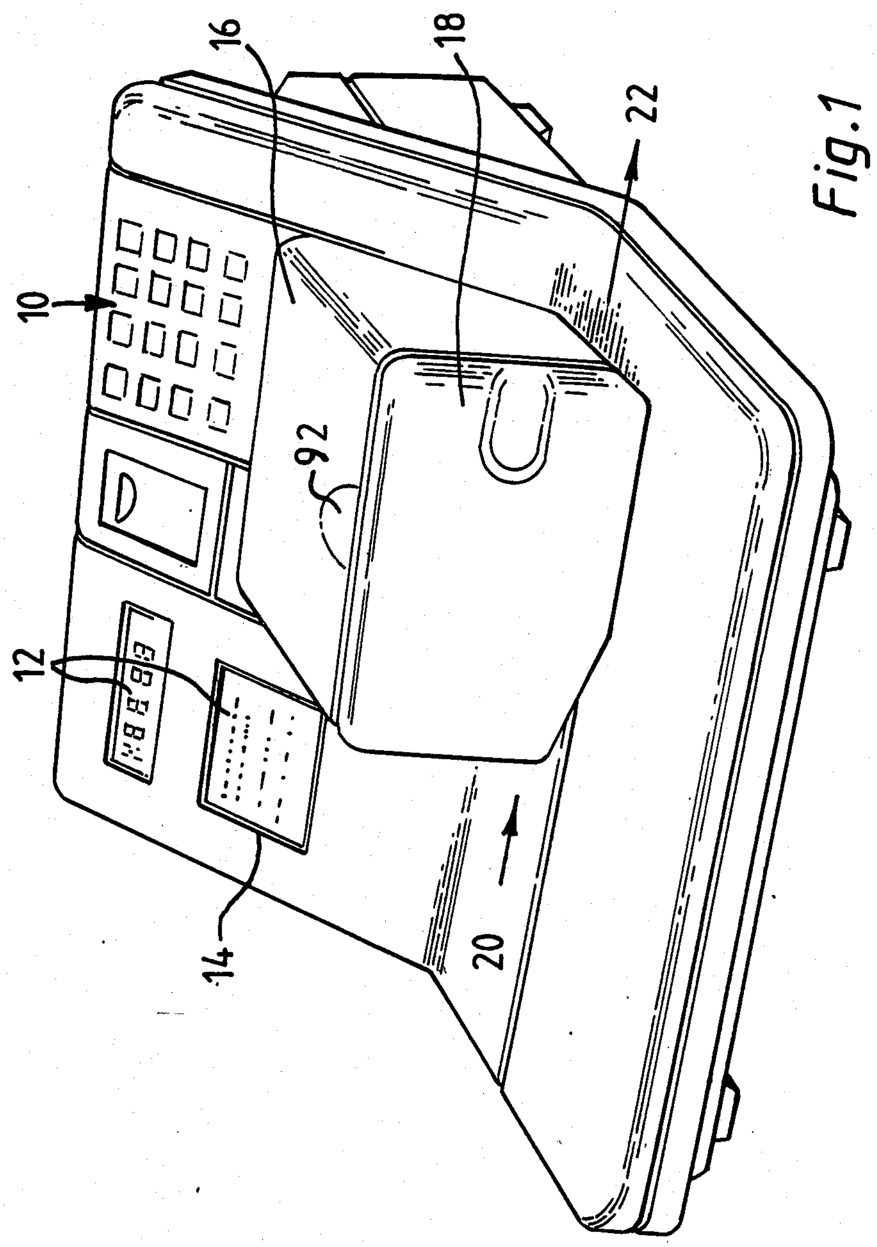
FIG. 1 is a perspective view of a franking machine in which an inked ribbon is contained in a removable cassette located in a compartment within the machine.

The franking machine is shown pictorially in FIG. 1 and includes a keyboard 10 for data entry and LED display devices 12 and 14 for displaying information which is to be printed during the franking operations. A printing ribbon cassette is received in a compartment 16 which has a door 18 which is openable to allow a cassette to be inserted so that the ribbon underlies a thermal printing head located within the machine(see item 27 in FIG. 2) and which extends into the housing 16 to cooperate with the ribbon housed within the cassette (as will hereinafter be described), in order to print information on to an envelope or like article which is inserted in the direction of the arrow 20, beneath the cassette compartment. The franked envelope emerges from the other side of the compartment as indicated by the arrow 22. The expression inked ribbon is intended to cover any dye coated or impregnated ribbon or tape, which dye can be deposited onto sheet material in contact therewith.

The printing head forms no part of the present invention but will be described in general so as to provide a more complete understanding of the overall operation of the machine.

Typically the printer is made up of one or more rows of points which can be individually electrically heated and which are selectively activated in timed relationship to the transport of the envelope relative to the printer. The heated points are commonly referred to as "thermal points". By sandwiching a dye coated or impregnated ribbon between the thermal points and an envelope, so printing onto the envelope can be achieved by selectively activating the thermal points so as to locally heat the ribbon and cause dye to be transferred at the heated point from the ribbon to the envelope surface.

Where the ribbon is coated or impregnated with thermally activatable dye and the printer is a thermal printer, it has been found that under sufficient pressure, the thermal printing step can produce sufficient adhesion between the ribbon and the envelope, to allow the movement of the latter to effect ribbon feed. This automatically ensures the required synchronism between envelope movement and ribbon movement. The ribbon is automatically peeled away from the envelope surface by causing the paths of the envelope and the ribbon to diverge.

In a franking machine, some information (fixed information) will be common to all impressions whilst other information (variable information) relating to amount and date etc. will vary from day to day and article to article. Fixed information may be entered via the keyboard 10 or may be stored in a memory device such as a read only memory (ROM) within the machine but the variable information is most preferably entered via the keyboard 10. However entered, in the franking machine under consideration, the information is finally stored in a microprocessor controlled memory (not shown) and the processor is arranged to deliver timed electrical control signals for repeatedly and selectively energising the thermal points of the printer during, and in timed relationship to, the transport of the envelope (as will be described later).

Figure 6:
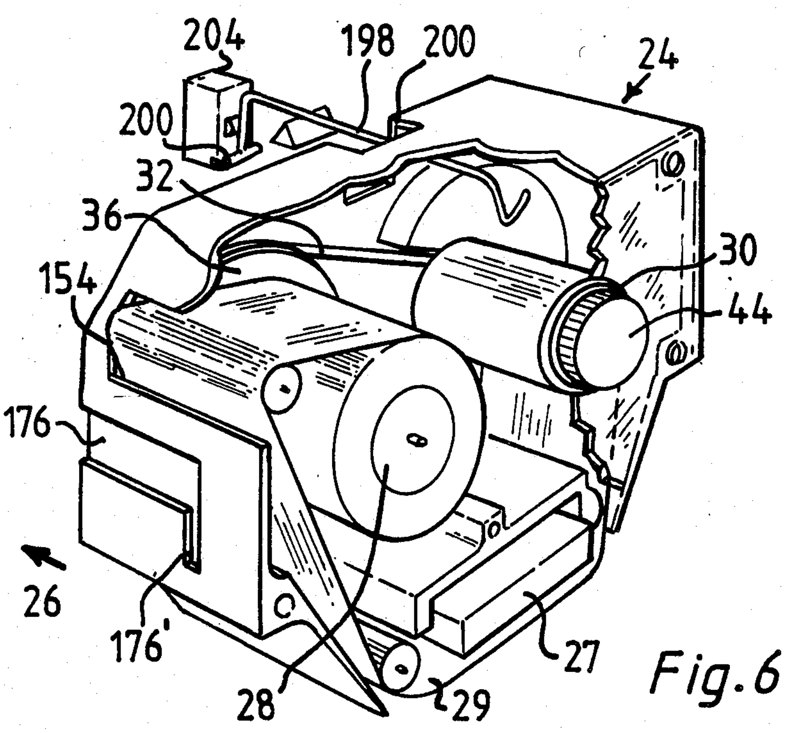
FIG. 6 is a cut away perspective view from one end of a cassette incorporating the invention.
Figure 7:
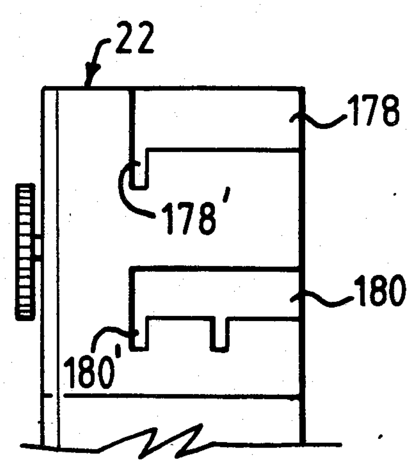
FIG. 7 is a view of the opposite end of the cassette.

Referring now to FIGS. 2 and 5 to 10, the cassette (best seen in FIG. 6) comprises an outer casing 24 shaped to allow it to be fitted into the housing 16 in the direction of the arrow 26 of FIG. 6. After initial horizontal movement into the compartment in the housing 16, a latch mechanism (to be described later) operates so as to lift the cassette into an elevated position as can best be seen in FIG. 2, where the cassette is shown in its operating position within the housing.

The lower section of the cassette carriage 24 is cut away at 25 to allow the casing to fit over the printing head 27 with the inked ribbon 29 of the cassette extending below the head.

Figure 8:
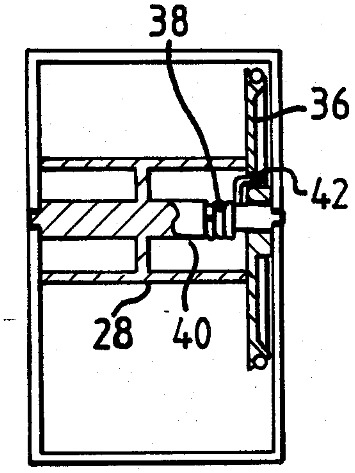
FIG. 8 is a cross-section through the cassette of FIG. 6 showing the non-return mechanism.
Figure 9:
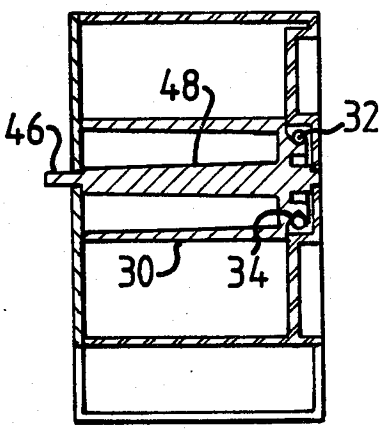
FIG. 9 is a similar cross-section through the cassette showing the take-up spool mounting assembly.

The cassette 24 includes a delivery spool 28 and a take-up spool 30. An endless belt 32 preferably of elastic material couples the two spools by passing around a peripheral groove 34 at one end of the take-up spool 30 (see FIG. 9) and around a similar groove in a pulley 36 mounted at the similar end of the delivery spool 28 and connected thereto by a one way clutch as will hereinafter be described. The diameter of the pulley 36 is considerably greater than that of the spool 30 and the transmission ratio between the pulley 36 and spool 30 is selected so as to be greater than the transmission ratio between the roll of ribbon on the supply spool to that on the take-up spool, even when the former is full and the latter is empty. Consequently the belt 32 will always attempt to drive the take-up spool 30 at a speed in excess of that required to simply wind on the ribbon (which is being pulled off the supply spool) and in this way the ribbon is tensioned between the two spools.

Where a non re-usable ribbon is employed, it is important that if the ribbon should become slack for any reason, the slack ribbon cannot be accidently rewound onto the supply spool 28. To this end the supply spool 28 is provided with a one way clutch to prevent accidental reverse rotation. This device is shown in FIG. 8 and comprises a coil spring 38 wound tightly around an axle 40 on which the supply spool 28 is fixed. The spring includes a tail 42 which engages in an aPerrure (not visible) formed in the cooperating end face of the pulley 36. The pulley 36 is otherwise freely rotatable about the axle 40 relative to the spool 28. Drive between the pulley 36 and the spool 28 is transmitted via the spring and tail when the pulley is rotated in one direction but the tightness of the spring on the axle is such that slipping will occur when the pulley is rotated in the opposite sense. It has been found that the same arrangement can also be used in which the spring slips relative to the axle in both directions of rotation, but to a much smaller extent in the windup direction than in the opposite direction.

Under normal circumstances ribbon drive is effected as previously mentioned by frictional contact and adhesion between the ribbon and the article to be printed. However, a knob 44 is mounted on an axial extension 46 of the axle 48 of the take-up spool 30 (see FIGS. 6 and 9) and manual movement of the ribbon is effected by rotating the knob 44 in an anti-clockwise manner so as to draw ribbon from the spool 28 onto the spool 30.

Due to the presence of the belt 32, the supply spool 28 will also be rotated but at a lower speed than the take-up spool 30 so as to maintain tension.

If the ribbon web 29 becomes slack, the one way clutch connection between spool 28 and pulley 36 prevents spent ribbon from being rewound onto the delivery spool 28. Thus if knob 44 is accidentally rotated in a clockwise manner, the lost motion connection will cause the slack loop to increase as ribbon is unwound from spool 30 and is not taken up by the delivery spool. The intention is that the user will discover that the slack is not being taken up but is in fact increasing before positive drive is effected between the pulley 36 and the spool 28, whereupon it is anticipated that the operator will rotate the knob 44 in the opposite sense (ie anti-clockwise) which will immediately result in the slack being taken up on the take-up spool 30.

Figure 2:
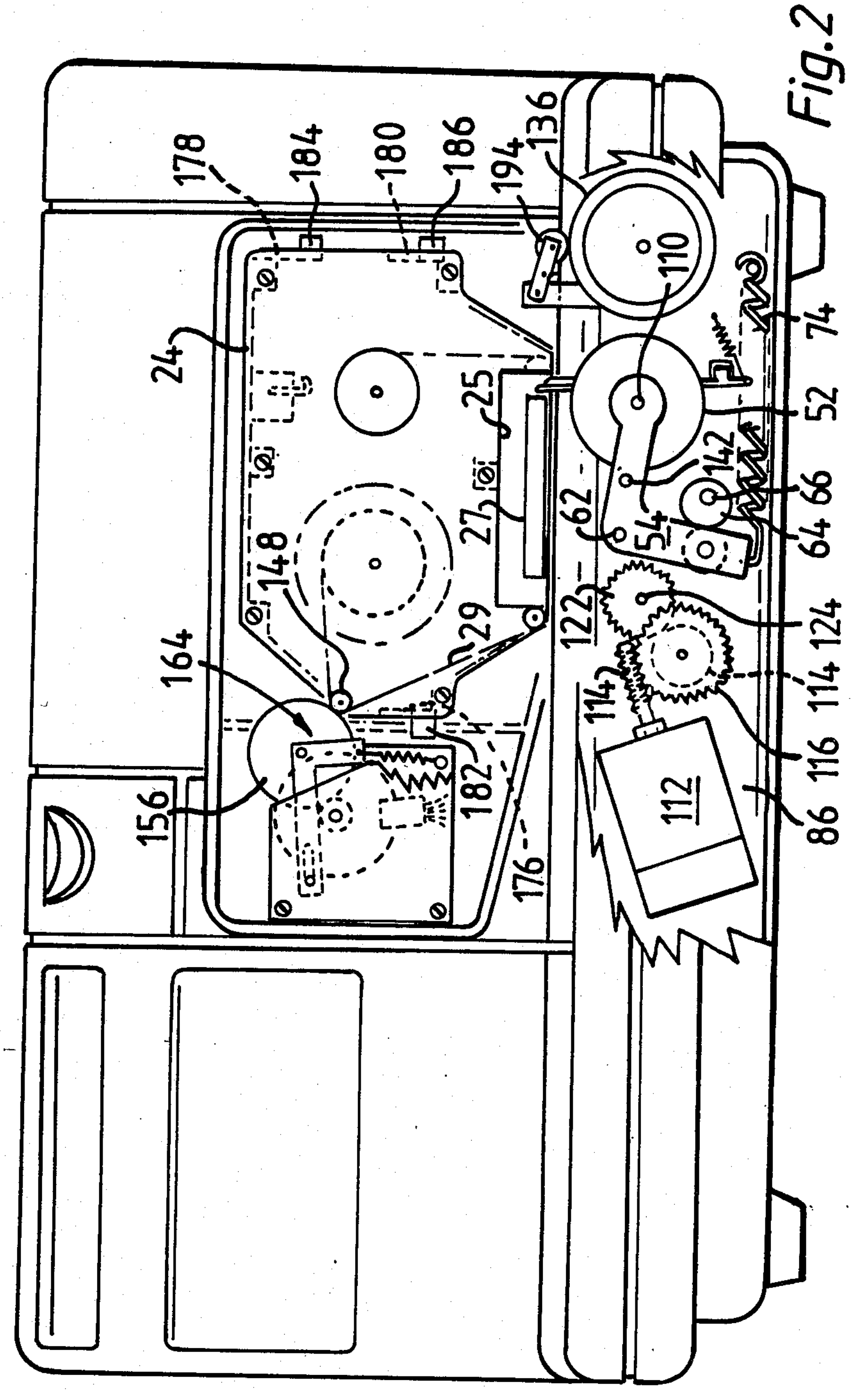
FIG. 2 is a front elevation with front plate partly cut away to show an inserted cassette and component parts associated therewith.

A fuller understanding of the operation of the cassette will be obtained by considering how it cooperates with the passage of an envelope through the franking machine shown in FIGS. 1 and 2.

Figure 13:
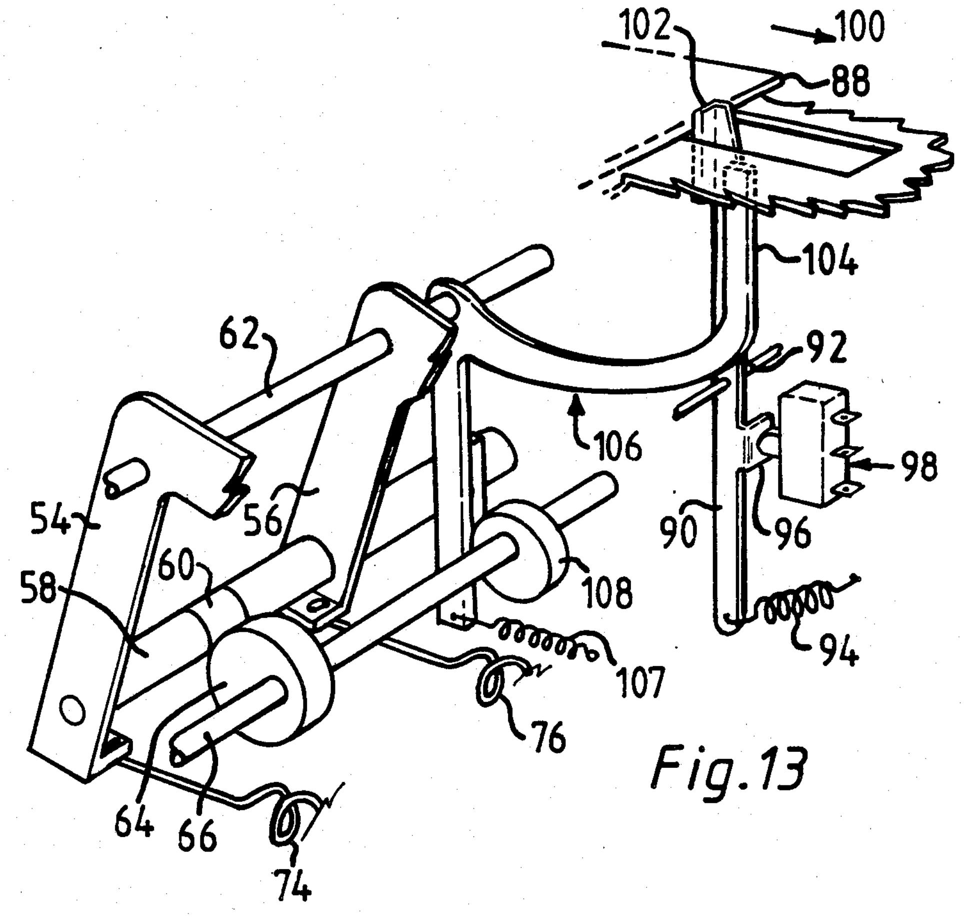
FIG. 13 is a scrap perspective view showing the envelope stop and release mechanism.

The envelope path includes a pressure roller 52 mounted between two L-shaped members 54 and 56 forming a subassembly (see FIGS. 2 and 13). A shaft 58 extends rigidly between the lower ends of the two members 54 and 56 and a cam follower is situated along the length thereof (see FIG. 13). The assembly of the members 54 and 56 is pivotal about an axle 62 (see FIG. 13) to allow the roller 52 to be raised and lowered relative to the envelope path under the action of a cam 64 mounted on a cam shaft 66. Shaft 66 is driven by a motor 68 acting through a worm gear 70 and worm wheel 72 (see FIGS. 3 and 12).

Initially the roller 52 is in the lowered position shown in FIG. 2, but upon operation of motor 68 cam 64 is rotated so as to allow the sub-assembly formed by the members 54 and 56 to rotate in an anti-clockwise manner (as shown in FIG. 2) under the action of two springs 74 and 76 (see FIG. 13). Only one of these springs (spring 74) is visible in FIG. 2 and for clarity the springs have been omitted from the underside view in FIG. 3. However, referring to FIG. 3, the springs in question extend between the holes 78 and 80 in the inturned lower ends of the carriers 54 and 56 and a rigid rod 82 which extends between two side plates 84 and 86 (see FIG. 3).

To assist in reconciling the Figures, plate 86 can be seen in FIG. 2 due to the fact that plate 84 has been cut away in FIG. 2.

In operation, an envelope shown at 88 in FIG. 13 is introduced below the cassette housing 16 until its leading edge touches the upper end of a lever 90 which constitutes an envelope sensor. The latter is pivoted about an axle 92 and is normally held in a vertical position against a stop (not shown) by a spring 94. The lever includes an actuating lug 96 which under the action of the spring 94 is held against the operating member of a microswitch 98. The microswitch is released as the upper end of lever 90 is moved in the direction of the arrow 100 in FIG. 13.

The upper end of lever 90 includes a lateral flange 102 which upon intial movement under the influence of the leading edge of the envelope engages the upper end 104 of a Z-shaped member 106 pivoted on the axle 62 and normally held in the position shown in FIG. 13 by a spring 107 and a cam 108 also carried by the cam shaft 66. Rotation of the cam shaft 66 will cause cam 108 to move relative to the lower arm of the Z-shaped member 106 and will cause the latter to move against the spring 107 and thereby lower the upper end 104 relative to the flange 102. Until end 104 drops below the lower edge of the flange 102, the envelope is prevented from passing further through the machine but as soon as the upper end of lever 104 drops below the flange 102, the lever 90 can continue to move in the direction of arrow 100, pivoting about the axle 92 against the action of return spring 94, and permitting onward movement of the envelope in the direction of arrow 100.

Speed of rotation of shaft 66 and the position and shape of the cams 64 and 108 are selected so as to ensure that the upper end of the lever 90 inhibits the movement of the envelope in the direction of arrow 100 until the roller 52 has just been raised into its operating position under the action of the springs 74 and 76.

The roller 52 serves two purposes:

(a) to provide a firm but resilient pad as a backing for the envelope or other item during printing and (b) to provide the necessary drive for moving the envelope or other article through the franking machine at least during the printing operation.

Figure 3:
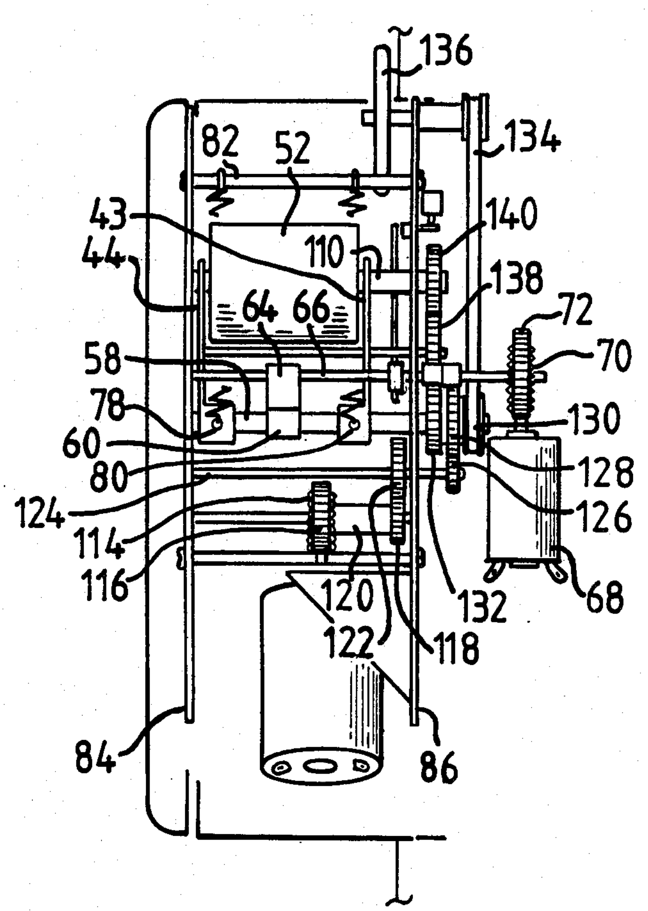
FIG. 3 is an underside view of inside the machine with certain parts removed for clarity.
Figure 12:
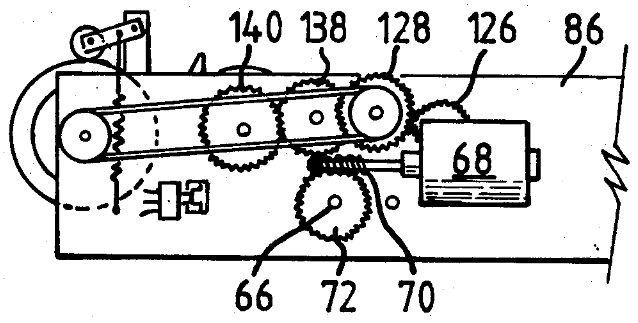
FIG. 12 is a rear view of the lower part of the machine with covers removed.

To this end the roller 52 is mounted on shaft 110 which is driven by a second motor 112 via a complex gear train which can best be seen by comparing FIGS. 2, 3 and 12.

The output shaft of the motor carries a worm gear 114 which meshes with worm gear 116. A smaller diameter toothed wheel 118 linked to the worm wheel 116 by a sleeve 120 (see FIG. 3) drives a gear wheel 122 mounted on a shaft 124 which extends through the plate 86. Beyond the plate and not visible in FIG. 2, is mounted another gear wheel 126 which meshes with a gear wheel 128 carried by a sleeve 130 on which a second gear wheel is mounted identified by reference numeral 132 and which provides a driving surface for an endless belt 134 for driving a pinch wheel 136 located at the envelope exit.

The gear wheel 132 meshes with another similar sized intermediate gear wheel 138 which in turn meshes with another gear wheel of similar size 140 which is attached to the shaft 110 on which the roller 52 is mounted.

Although not clearly shown in FIGS. 3 and 12, the intermediate gear wheel 138 is in fact mounted on a shaft 142 which extends between the two members 54 and 56 and through a slot (not shown) in the plate 86 so that the intermediate gear wheel 138 moves with the roller 52 and the gear wheel 140.

Likewise the gear wheel 132 (not visible in FIG. 12 by virtue of being hidden) is mounted by an extension of the shaft 62 on which the sub-assembly formed by members 54 and 56 pivot so that the center of rotation of gear wheel 138 rotates about the centre of rotation of gear wheel 132 and gear wheel 138 remains in constant mesh both with 132 and 140.

Figure 4:
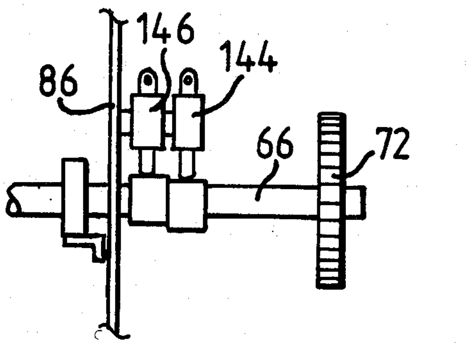
FIG. 4 illustrates to an enlarged scale part of the main cam shaft and two microswitches associated therewith.
Figure 5:
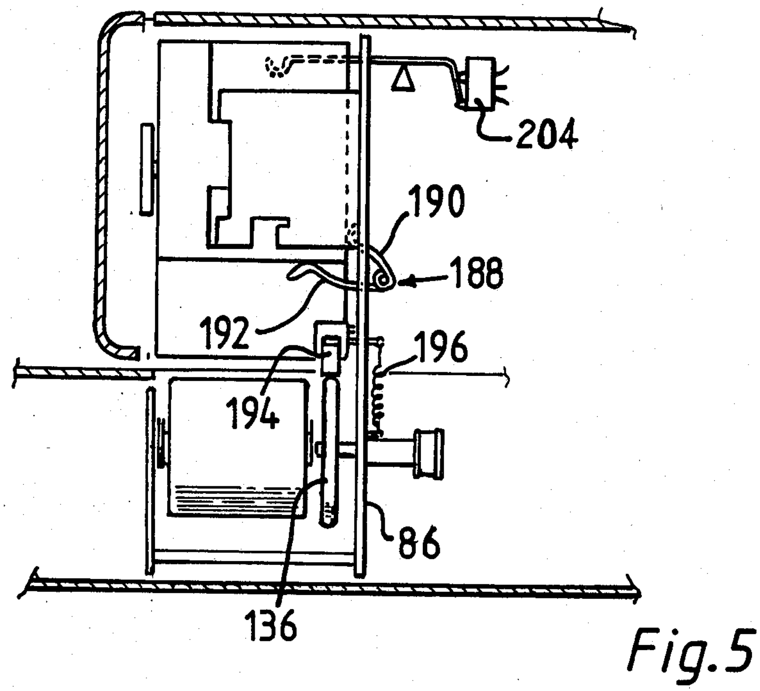
FIG. 5 is a view of the exit end of the machine with parts removed to reveal internal functional details.

Although no detail is given of the control circuitry, reference has already been made to the fact that control signals are derived from the operation of microswitch 98 for controlling the supply of operating current to motor 68. Other microswitches are provided as shown in FIG. 4 operated by cams on cam shaft 66. One of the microswitches designated by reference numeral 144 is set to open when the motor has rotated the cam shaft 66 by an amount just sufficient to raise the roller 52 into its operating position.

Activation of the thermal points at the print head to commence franking is timed in relation to the controlled entry of the envelope. Franking commences when the envelope transport mechanism has taken over to move the envelope through the apparatus. In order to initiate the print control signals at the correct instant, the processor delays release of the timed control signals for activating the thermal points by a period of time sufficient to allow the drive motor 68 to raise the pressure roller 52 to engage the envelope and the ribbon.

The exit of the envelope is controlled by the exit pinch wheel 136 and the spring loaded jockey wheel 194 mounted thereabove, and tensioned by a spring 196.

The pinch wheel is driven by the endless belt 134 as previously described with reference to FIG. 3.

Due to the differing shapes, thicknesses and surfaces of envelopes and other postal items which may be entered into the machine, and additionally due to variations along the length of any given item, a precisely uniform movement of the envelope by its transport mechanism cannot be ensured. Consequently in order to arrange that the franking information is imparted without distortion, the control signals which repeatedly and selectively energise the thermal points must be appropriately timed to incorporate timing variations corresponding to irregularities in envelope transport. It is therefore appropriate to monitor the transport of the envelope through the machine and derive the timing for the thermal point energising signals from the actual movement of the envelope.

In the machine under consideration, the envelope and ribbon within the cassette travel precisely together and it is therefore possible to monitor the movement of the envelope by monitoring the linear movement of the ribbon.

Figure 10:
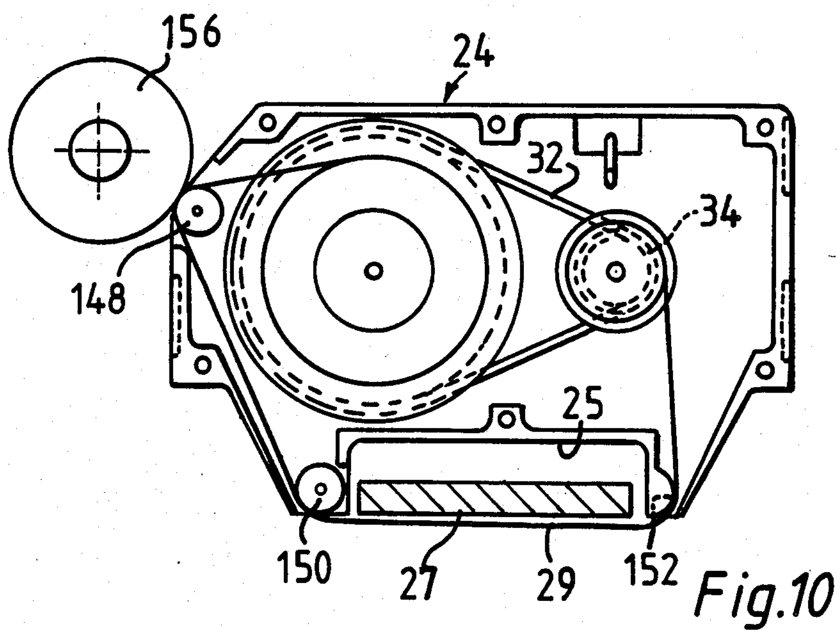
FIG. 10 shows the inserted cassette and immediately adjacent cooperating component parts of the machine.

To this end the cassette makes provision for monitoring the linear movement of the ribbon within the cassette. Referring to FIGS. 6 and 10, it will be seen that the ribbon path within the cassette includes a guide roller 148 around which the ribbon passes after it leaves the delivery spool, a second roller 150 just ahead of the print head position and a curved guide surface 152 around which the ribbon passes after leaving the print position and just in advance of the take-up spool. The roller 148 is located just behind a window 154 situated at an angled corner of the cassette housing so as to expose the ribbon passing around the roller for engagement by an optical encoder carried by the franking machine and located in or extending into the housing into which the cassette is fitted.

Figure 11:
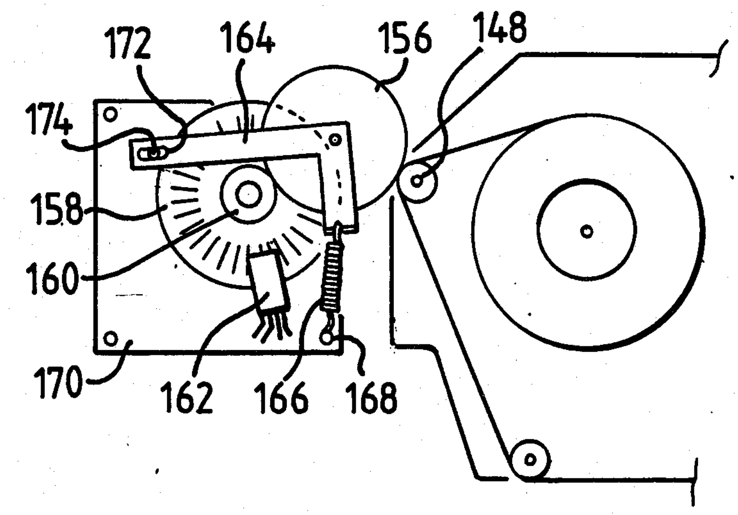
FIG. 11 is a scrap view showing an optical encoder which is driven by the movement of the ribbon within the cassette.

Detail of the encoder is given in FIG. 11 of the drawings and in particular this comprises a ribbon-driven wheel 156 which is spring loaded towards the roller 148 so that the ribbon is nipped between the two rollers 156 and 148. An apertured disc 158 is driven by the wheel 156 by engagement of the latter with a roller 160 mounted on the same shaft as the apertured disc 158. An optoelectric coupler 162 comprising a light emitting diode (LED) source on one side of the apertured disc and a photodetector on the other side, provides electrical output pulses corresponding to the interrupts of the light beam produced when disc 158 rotates. The ratios of the driving and driven wheels are selected so that the disc 158 rotates at a speed corresponding to the speed of linear movement of the ribbon 29 through the cassette and which in turn corresponds to the linear speed of the envelope. Any irregularities in envelope movement are reflected in changes in the speed of rotation of the disc 158 and therefore in the timing and position of the pulses in the electrical signal produced by the opto-electric coupler 162.

In order to ensure that the wheel 156 always resiliently engages the ribbon 29, the wheel 156 is mounted at the vertex of an L-shaped member 164 and one end of one of the arms of the L-shape is connected via a spring 166 to an anchoring point 168 on a backing plate 170, whilst the end of the other arm includes a slot 172 through which a pin shown diagramatically at 174 passes, thereby allowing the wheel 156 to pivot about the axis of the pin 174 but also to move in a direction parallel to the longitudinal direction of the slot 172. The effect of the spring 166 is to pull the wheel 156 into permanent contact with the roller 160 and the ribbon extending around the roller 148 so that drive from the moving ribbon to the wheel 156 is imparted to the roller 160 irrrespective of the absolute position of the wheel 156.

Mention has previously been made of a two-stage operation for inserting the cassette into the housing. This is occasioned by virtue of the fact that the cassette has to be inserted into the housing broadside-on in the direction of arrow 26 in FIG. 6 but after it has been fully located at the rear of the housing, it must then be lifted so as to bring the window 154 just below the wheel 156 of the encoder. The cassette is shown in its raised and operating position in FIG. 2 with the roller 148 in contact (through the ribbon) with the wheel 156.

To achieve the horizontal and vertical motion and in accordance with the invention the opposite ends of the cassette are formed with slideways, one of which is denoted by reference numeral 176. Two slideways are provided at the opposite ends and can be seen in FIG. 7 and denoted by reference numerals 178 and 180. The three slideways can be seen in dotted outline in FIG. 2.

On the cooperating opposed side walls of the cassette housing are three protrusions 182, 184 and 186 which respectively engage the slideways 176, 178 and 180 and locate the cassette vertically as it is pushed into the housing.

The slideways include lateral slots 176', 178' and 180' which are divisional to slidingly receive the protrusions 182, 184 and 186 respectively where the cassette has been fully pushed into the housing.

Figure 14:
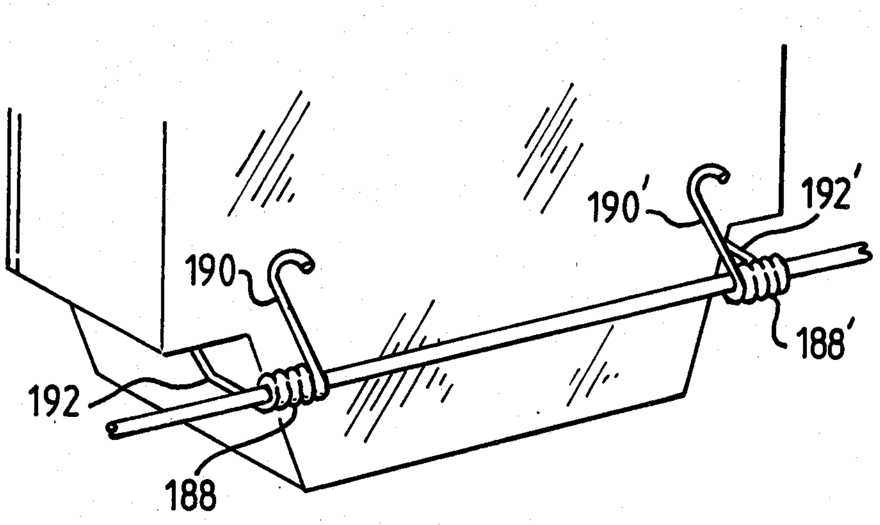
FIG. 14 is a rear view of the cassette showing the toggle springs at the rear of the compartment.

In order to facilitate the insertion of the cassette into its final elevated position in which the protrusions engage in the slots as opposed to the slidways, toggle springs are provided at the rear of the cassette housing which are engaged by the rear of the cassette as the latter is pushed into position. One of the toggle springs is shown at 188 in FIG. 5 and a similar one 188' (FIG. 14) is located at the opposite end of the cassette housing. The toggle spring includes two diverging arms, one designated 190 and a longer one designated 192. On initial insertion the rear of the cassette engages the arm 190 and the longer arm 192 engages the underside of the cassette. Continued rearward movement of the cassette causes the arm 190 to be moved upwards and rearwards thereby tensioning the spring since the longer arm 192 is prevented from following due to its engagement with the underside of the cassette.

As soon as the cassette has been pushed into the housing to an extent sufficient to enable the protrusions to engage the vertical slots in its ends, the cassette can move upwards, and does so, under the action of the two arms 192 of the two springs which at that stage are fully tensioned with the arms 190 almost vertical.

The movement of the cassette in an upward direction is limited by the depth of the slots 176', 178' and 180' in its ends and once the protrusions have engaged the slots and the cassette has moved into its fully raised position with the protrusions at the bottom of the slots, it remains firmly in that position under the action of the springs.

Removal of the cassette is achieved quite simply by pressing the cassette in a downward direction within the housing until the protrusions are fully clear of the slots. The housing can now move back along the slideways out of the housing under the action of the springs.

Since the ribbon will normally be hidden from view, it may be important to determine when the ribbon has been nearly used up. To this end a used ribbon detection lever 198 extends through an opening 200 in the rear wall of the cassette and is pivoted at 202 relative to a microswitch 204. The outboard end of the lever 198 rests on the ribbon wrapped around the take-up spool 30 and as the diameter of the latter increases, so the lever 198 is raised. At a given point the lever will have been raised sufficiently to actuate the microswitch 204, the operation of which is used to indicate via a visible or audible (or both) alarm, that the ribbon cassette is virtually exhausted.

It will be seen that the lever 198 will automatically protrude through the cut away region 200 as the cassette is inserted into the housing and requires no setting-up.

The machine may be arranged to be switched off after a predetermined amount of use after the microswitch 204 has actuated.

I claim:

1. A cassette and compartment for securably receiving said cassette, guide means for guiding the cassette during insertion into the compartment and retaining means for securing the inserted cassette, wherein spring means is located at the rear of the compartment having two mutually diverging resiliently displaceable arms one of which is engageable by the rearwardly advancing face of the cassette and the other of which is simultaneously engageable with a side wall of the cassette as said cassette is inserted into the compartment, and arranged whereby a force is applied by the said other arm of the spring means in a direction generally perpendicular to the direction in which the cassette is guided during insertion into the compartment, thereby on completion of said guided insertion to move the cassette in the said perpendicular direction into engagement with the said retaining means for securing the inserted cassette

2. A cassette and compartment therefor according to claim 1, wherein the retaining means comprises cooperating grooves and protrusions formed in end walls of the cassette and adjacent walls of the compartment.

3. A cassette and compartment therefor according to claim 1, where the retaining means comprises grooves in opposite ends of the cassette and inwardly directed protrusions within the compartment for engaging same.

4. A cassette and compartment therefor according to claim 1, in which there is an aperture in a side wall of the cassette through which a roller can at least in part protrude to engage a ribbon within the cassette to transmit drive between them, and the engagement of the roller and ribbon (or tape) is effected automatically as the cassette moves in the said perpendicular direction for engagement with the said retaining means.

5. A cassette and compartment therefor according to claim 1, which includes a supply spool containing a length of ribbon and a take-up spool for receiving ribbon from the supply spool.

6. A cassette and compartment therefor according to claim 5, wherein the ribbon is an ink carrying coated tape for printing.

* * * * *